United States Patent Office 3,159,830
Patented Dec. 1, 1964

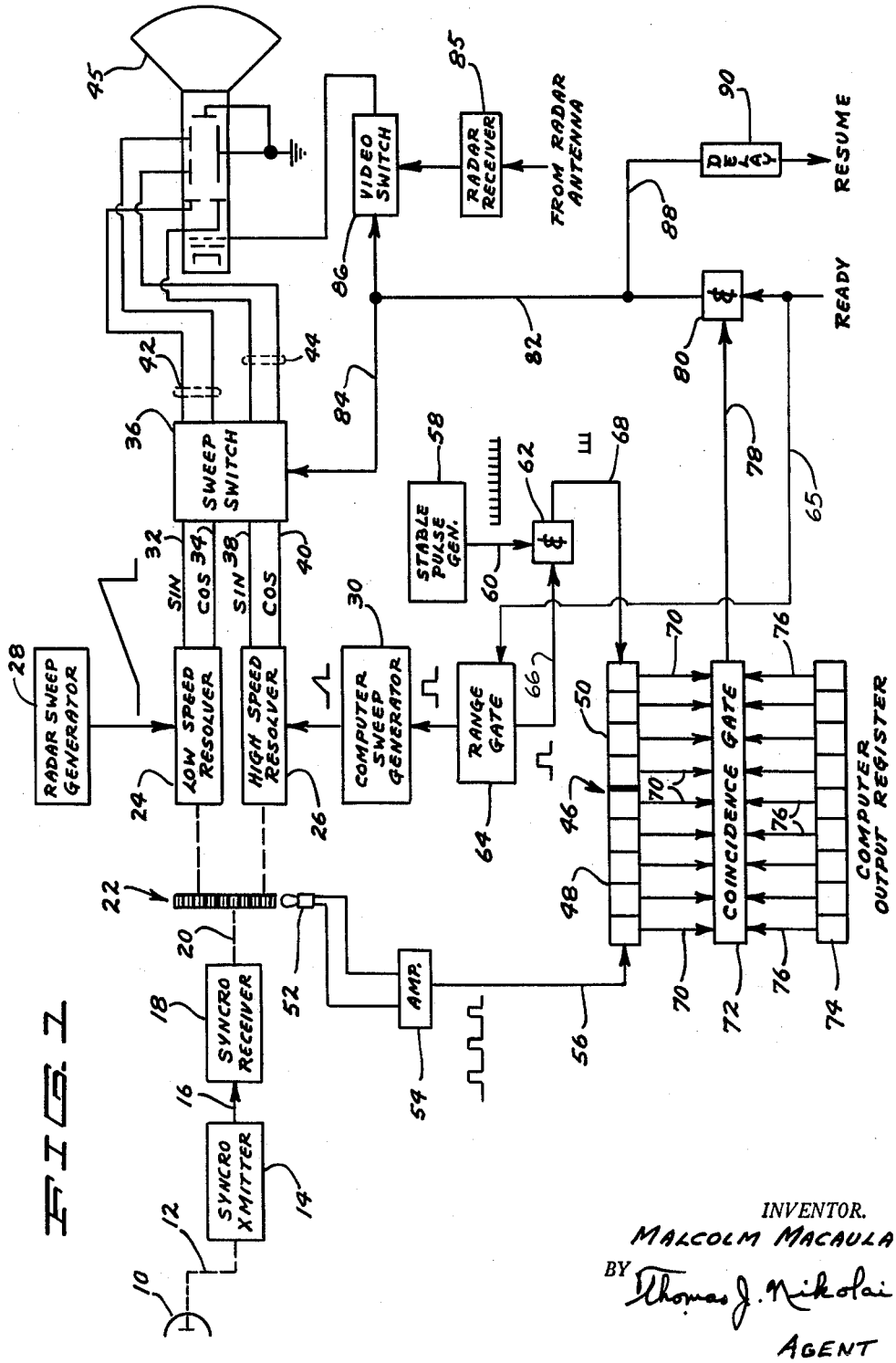

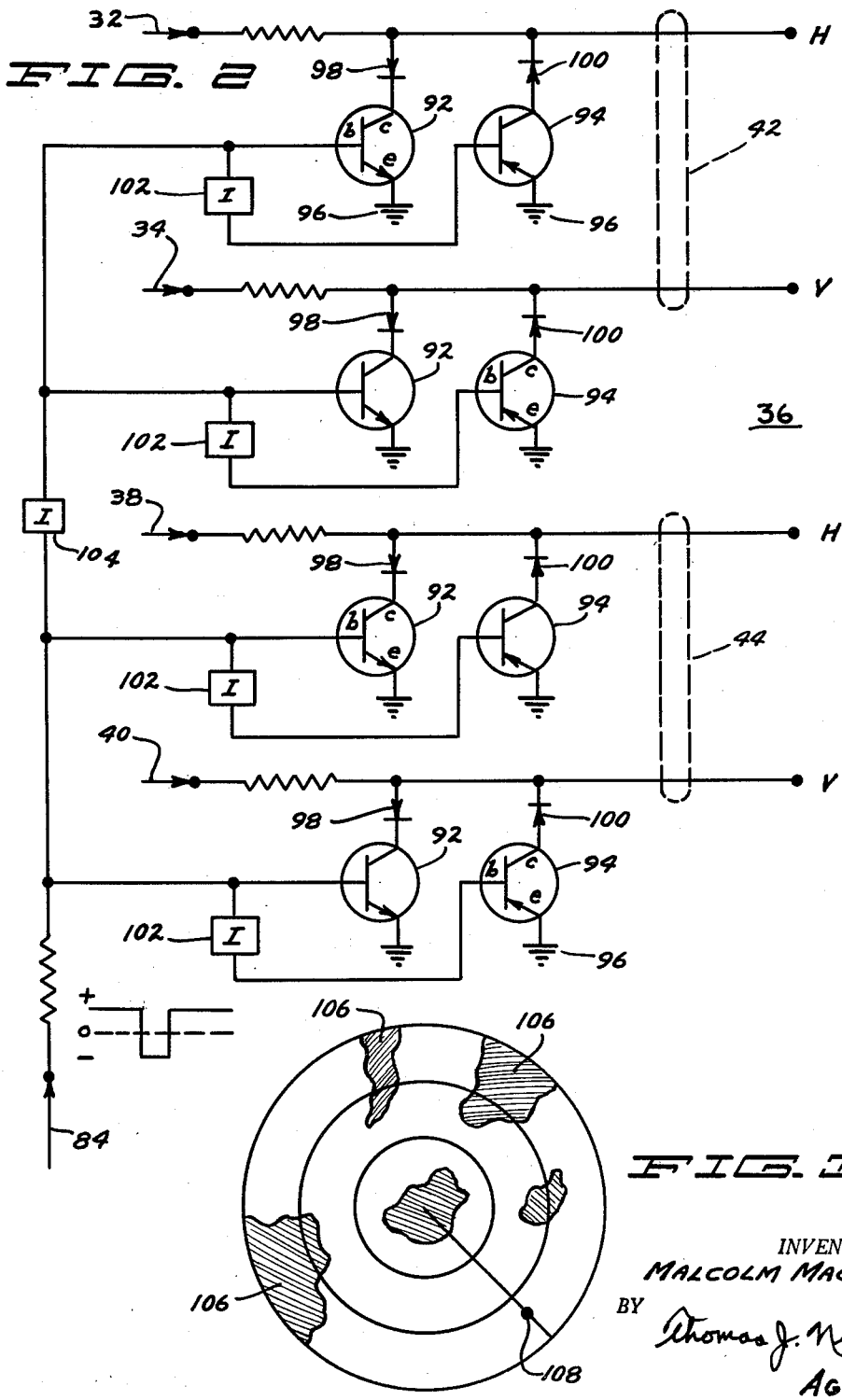

3,159,830
METHOD AND APPARATUS FOR VISUAL PRESENTATION OF DIGITAL AND ANALOG INFORMATION
Malcolm Macaulay, St. Paul, Minn., assignor to Sperry Rand Corporation, New York, N.Y., a corporation of Delaware
Filed Mar. 16, 1961, Ser. No. 96,274
9 Claims. (Cl. 343—5)

This invention relates generally to display apparatus and more specifically to apparatus for allowing both radar information and information generated by a digital computer to be displayed on the same cathode-ray tube.

Modern digital computing equipment has been found applicable to the solution of "real time" problems. By real time operation is meant that the processing of data occurs in synchronism with a physical operation in such a fashion that the results of the data-processing are useful almost immediately to the completion of the physical operation. One example of real time operation of digital data processing equipment is in the application of such equipment to the solution of missile guidance problems. In such application the computer typically receives data from scanning radars and the like concerning the location, speed, direction of travel, etc. of the target, processes this data, and computes the trajectory which a missile must follow to destroy the target, taking into consideration such factors as the speed, direction and location of the target that it is desired to destroy. It has been found to be convenient to employ conventional radar equipment to provide a display of the actual target location. In this respect a so-called plan-position indication (PPI) display may be employed. However, real time radar data handling imposes severe speed requirements on the equipment in order to achieve a desired degree of range resolution accuracy. For example, a time interval of only one microsecond is equivalent to approximately three hundred yards of target range. In order to achieve simultaneous display of both radar data and computer generated data, it is necessary to provide hardware that is compatible in terms of operating speed with both radar equipment and digital data processing apparatus.

In the PPI type display, the information picked up by the radar antenna is in polar coordinates, i.e., range is measured by the time it takes for an echo signal to return from the target or obstacle and azimuth is indicated by the angular position of the antenna with respect to an arbitrarily defined reference line. However, most display arrangements such as cathode-ray tubes must have the information signals applied thereto in rectangular coordinates so that one component may be applied to the horizontal deflection circuit and a second component to the vertical deflection circuit to illuminate a particular portion of the sensitized face of the cathode-ray tube. When it is desired to tie a computer into the radar set and the radar display equipment, the information sent to the computer is generally also in polar coordinates since the computer is likewise tied in with the antenna of the radar equipment. It can be seen then that in order to display computer processed information, it becomes necessary to, in some manner convert the computer generated data from binary encoded polar coordinates to rectangular coordinates, in order to deflect the electron beam in the cathode-ray tube. One approach to the problem would be to provide in the memory section of the computer a table of polar-to-rectangular coordinate conversion factors and program the computer to make the conversion before the data is gated into its output register. This approach, however, is not altogether satisfactory since computer time is required to effect this translation and therefore the computer is unavailable for the processing of other input data.

The apparatus of this invention may conveniently be employed to permit computer communication with the radar display equipment in polar coordinates, thereby eliminating the need for this conversion in the computer and permitting the processing of data within the computer in polar coordinates exclusively. In accordance with the teachings of this invention, this is accomplished by the apparatus which is inserted between the display tube and the computer's output register.

It is accordingly an object of the present invention to provide an arrangement of switching components with a radar display to allow the simultaneous display of both computer generated data and data picked up by the radar antenna.

Another object of this invention is to provide an improved means whereby both the computer generated information and radar information can be displayed on the screen of a cathode-ray tube in rectangular coordinates.

Still another object of this invention is to provide a means for allowing a computer to operate on data presented to it in polar coordinates and to display information generated by the computer in rectangular coordinates without requiring computer time for making a translation.

According to a present preferred embodiment of this invention, the advantages inhering therein referred to above may be realized by employing, in addition to the hardware normally used to provide a display of data picked up by the antenna of the radar equipment, a second channel under control of the computer which permits the data contained in the computer's output register to be displayed on the face of the radar scope when certain conditions are satisfied.

These and other more detailed and specific objects of the present invention will be disclosed in the course of the following specification, reference being had to the accompanying drawing in which:

FIGURE 1 illustrates schematically the details of a preferred embodiment of the invention;
FIGURE 2 shows the circuit details of the sweep switch employed in the apparatus of FIGURE 1; and
FIGURE 3 shows a typical PPI display.

Referring now to FIGURE 1, there is shown an antenna 10 which is adapted to rotate so as to scan a circular area. Antenna 10 is mechanically coupled by means of a linkage 12 to the rotor of a synchro-transmitter 14. The stator windings of the synchro 14 are brought out by means of a cable 16 to the input of a synchro receiver 18. A shaft 20 which is driven by the rotor of receiver 18 is coupled through a gear train 22 to the rotors of a pair of resolvers or rotary transformers 24 and 26. The gear train 22 is designed such that the rotor of the resolver 24 is driven at a substantially lower speed than the rotor of the resolver 26. The rotor of the low speed resolver 24 receives its excitation from a sweep signal generator 28 which is a conventional part of the radar equipment. The high speed resolver, on the other hand, is excited by means of a sweep generator 30 which forms part of the computer controlled channel. The low and high speed resolvers 24 and 26 operate on the excitation signals applied thereto to produce two components having the same wave form as the excitation signal but proportional respectively to the sine and cosine of the orientation angle of the shaft of the resolver with respect to an arbitrarily defined reference. The two components from the low speed resolver are applied by way of conductors 32 and 34 to a first pair of input terminals on a switching device 36. Likewise, the two components produced by the high speed resolver are applied by means of the conductors 38 and 40 to a second pair of input terminals on the switching device 36. Switch 36 is provided with a pair of output cables 42 and 44 which, in turn, lead to the deflection system of the cathode ray tube 45 which forms part of the radar display unit. The above-mentioned components, exclusive of the high speed resolver, are included in the channel normally used to display radar information.

In order to provide a means for displaying computer-generated information, there is included in the system illustrated in FIGURE 1 a second channel which includes a means, indicated generally by the numeral 46, for counting digital type signals. The counting means 46 is comprised of two binary counters 48 and 50. Means, including a timing signal generating device, are used to advance the counter 48. The timing signal generating means is shown in FIGURE 1 as being a pick-up head 52 magnetically associated with the shaft of the high speed resolver 26. As such, the shaft is provided with a plurality of magnetized spots distributed uniformly in a narrow band about its circumference. As the shaft rotates, these spots pass in close proximity to the pickup head 52 and cause a signal pulse to be induced therein. It should be understood that other devices such as a phototube pick-up may be employed, and the use of a magnetic device is not intended to limit the invention. The signal induced in pickup head 52 are amplified and shaped if necessary by means of an amplifier 54 and applied through conductor 56 to the input terminal of the counter 48.

Means are also provided for advancing the count contained in counter 50. More specifically a crystal controlled oscillator or other type pulse generator 58 having relatively stable frequency characteristics is connected by means of a conductor 60 to a first input terminal of a two input AND gate 62. The other input terminal of gate 62 receives its enabling pulse from the range gate 64 over conductor 66. When an enabling pulse is applied to the AND gate, the pulses from source 58 are allowed to pass therethrough and over conductor 68 to the input terminal of counter 50.

The counters 48 and 50 may take any number of forms commonly used in digital systems. A fundamental type of counter which may be employed is the one comprised of a plurality of conventional electronic flip-flops each having two stable electrical states. A flip-flop of this type may comprise a pair of triodes connected in parallel across a supply of voltage and having their grids cross-connected so that the plate voltage of one tube controls the grid voltage of the other. The application of pulses of sufficiently negative potential to the common cathodes of these tubes will drive the cathode of the non-conducting tube negative with respect to its grid in an amount to initiate tube conduction. Due to the cross-connection of the grids and plates, the grid potential of the tube which formerly was conducting is lowered which in turn increases the grid voltage of the tube just initiating conduction, quickly reversing the circuit to its other stable state. By cascading a plurality of these basic flip-flop stages, the number of stable electrical states of the counting chain so formed increases exponentially. Each stage of the counters 48 and 50 is provided with an output terminal 70. These output terminals are all connected to a coincidence gate 72. Since many forms of coincidence or AND gates are well known in the art, it is deemed unnecessary to describe in detail the construction of gate 72.

The information to be displayed is placed by the computer in the output register 74. Register 74 may also be comprised of a plurality of cascaded flip-flop stages so that binary data may be stored therein. Like the counters 48 and 50, register 74 also has an output conductor 76 for each of its stages. These conductors are also connected to a second set of input terminals on the coincidence gate 72. When the information contained in the counters 48 and 50 is identical to that contained in the computer output register 74, coincidence gate 72 develops an output signal on conductor 78. Since conductor 78 is connected to a first input terminal of an AND gate 80, when computer READY signals are applied to the second input terminal of this gate, the pulse from the coincidence gate is allowed to pass by means of conductors 82 and 84 to the toggling terminal of the switching device 36. In addition, this last mentioned pulse is allowed to pass through a video switch 86 to the grid circuit of the display tube 45 in the radar equipment to cause intensification or unblanking of the trace. The output pulse on line 82 also passes through a conductor 88 and a delay line 90 back to the computer. A signal on this last mentioned line is used by the computer to indicate that the information stored in the output register has been displayed and that now new information may be placed therein. Normally, the radar receiver 85 is connected through the video switch 86 to the grid circuit of the display tube 45 such that the radar returns or echoes are displayed. The pulse on line 84, however, blanks out momentarily the radar display and allows intensification by the computer generated pulse only.

Now that the lay-out of the system has been described in detail, a discussion of the operation of the system will now be presented.

*Operation*

The antenna 10 is a conventional radar scanning device which may be used for both transmitting pulses and receiving the echo signals. The antenna is capable of scanning 360° in azimuth and generally is adjustable in angle of elevation also. The mechanical linkage 12 connects the antenna 10 to the rotor of the synchro transmitter such that it rotates in synchronism with the rotation of the antenna. As is well known in the art, the synchro transmitter operates to produce an electrical voltage which varies in accordance with the displacement of the rotor from a pre-determined position. Therefore, on cable 16 there is developed an electrical signal which may be used to drive the synchro receiver 18. The shaft 20 of the receiver therefore also rotates in exact synchronism with the rotation of antenna 10. It is, of course, obvious that the use of the synchro transmitter and receiver would not be necessary if the antenna is located in close proximity of the display apparatus since it would then be possible to directly couple the shaft 20 to the antenna. However, where it is desired that the antenna be located remotely from the display apparatus, the use of synchros or other such devices proves expedient.

As shown in FIGURE 1, the shaft 20 drives the low-speed resolver 24 and the high-speed resolver 26 through the gear train 22. The gear ratios involved in gear train 22 are such that the resolver 26 is driven at a substantially higher speed than is the resolver 24. In fact, the rotor of the low speed resolver may be turning at the same rate as the antenna 10 whereas the rotor of the high speed resolver may be turning at 100 times this rate. The low speed resolver is excited by means of the radar sweep signal generator 28. As a result, the signals developed on lines 32 and 34 are of the same triangular waveform as the sweep signals, but proportional in amplitude respectively to the sine and cosine of the orientation angle of the shaft of the low speed resolver. As is well known in the art, when sinusoidal signals differing in phase of 90° are applied to the horizontal and vertical deflection circuits of a cathode-ray tube, a rotating field which affects the electrons emitted from the cathode of the tube, is created. It is not intended that this invention be limited to a system employing resolvers or rotary transformers, since several schemes are well known whereby a triangular sweep signal may be amplitude modulated in a sinusoidal manner.

The component varying as the sine of the orientation angle of the resolver is connected by means of the conductor 32 to a first input terminal of the sweep switch 36. In a like manner the cosine component is conducted over line 34 to a second input terminal of the switching means 36.

The sweep generator 30 may take a form such as illustrated on Page 233 of the third edition of the book entitled "Principles of Radar" by Reintjes and Coate which was published in 1952 by McGraw-Hill Book Company. As such, when supplied with an input of a rectangular waveform from the range gate 64, a triangular sweep voltage is produced at its output terminals of the same duration as the input waveform. These sweep signals which are substantially higher in frequency than the sweep signals produced by generator 28 as used to excite the high speed resolver 26. As a result, the signals appearing on lines 38 and 40 and applied to the sweep switch 36 are again of the same triangular waveform and varying in a sine and cosine manner, respectively, but of a substantially higher frequency than the signals appearing on lines 32 and 34.

The sweep switch 36 may be used to alternately conduct the signals on the input lines 32 and 34 or the signals on the input lines 38 and 40 to the horizontal and vertical control circuits of the display tube. Illustrated schematically in FIGURE 2 is a preferred form of a switching arrangement which may be used to perform this function. It should be understood, however, that other arrangements may be devised for performing the function of switching means 36. As shown in FIGURE 2, each input line 32, 34, 38 and 40 has associated therewith a pair of transistors 92 and 94 of opposite conductivity type. Each of the transistors has an emitter electrode "e," a collector electrode "c" and the base or control electrode "b." In all cases, the emitter electrodes are maintained at a fixed potential such as ground 96. The collector electrodes of these transistors are connected through oppositely poled unidirectional current conducting devices such as diodes 98 and 100 to the input lines. The base electrodes are connected to receive, either directly or indirectly control signals over line 84, as will be described more fully hereinbelow. The base electrodes of the PNP transistors 94, however, are connected to the line 84 through an inverting amplifier 102 whereas the base electrodes of the NPN transistors 92 are directly connected to the line 84. Also, it may be noted that the transistors associated with input lines 32 and 34 have their base electrodes connected to the line 84 through an inverter 104. The signal normally present on line 84 is shown in FIGURE 2. As is illustrated, the control signal present on line 84 is normally positive in potential and reverses in polarity at the time that switching is to occur. Since under normal conditions a positive potential is applied to the base electrodes of the transistor 92 associated with input lines 38 and 40 and because a negative potential is applied to the corresponding electrodes of the transistor 94 associated with these two lines, these transistors are in a highly conductive state and hence the lines 38 and 40 are effectively grounded. In this case, the output from the high speed resolver is shorted to ground and does not pass through the deflection circuits of the display tube. Because of the manner in which the inverter 104 is connected into the circuit, the normally positive potential on the line 84 causes a negative voltage (with respect to the emitter electrode) to be impressed upon the control electrodes of the NPN transistor 92 associated with the input lines 32 and 34. The inverter 102, however, reverses the polarity such that a positive voltage is applied to the control electrodes of the transistor 94 associated with the input lines 32 and 34. Under these conditions all of these last mentioned transistors are rendered non-conductive and therefore present a high impedance to ground such that the signals from the low speed resolver are able to pass to the horizontal and vertical deflection circuits of the display tube. When the signal applied to line 84 reverses in polarity so as to become a negative voltage, the transistors 92 and 94 associated with the input lines 38 and 40 are driven to their non-conducting states while the transistors associated with the input lines 32 and 34 are switched to their high conductive states. It can be seen then that the effect of the negative polarity switching signal on line 84 is to set the switching circuit 36 such that only the signals from the high speed resolver are allowed to pass to the display tube deflection circuits. The diodes 98 and 100 are used in a conventional manner to suppress the collector current which may otherwise flow should the collector-base conjunction of transistors 92 and 94 become forward biased as the voltages on lines 32, 34, 38 and 40 change in magnitude and polarity.

Referring again to FIGURE 1, the range gate 64 which supplies the square wave pulses to the computer sweep generator 30 to control the maximum range of the sweep in use, also provides a square wave of the same pulse width to the AND gate 62 by way of the conductor 66. Range gate 64 may be an astable or free-running multivibrator which produces output pulses of a predetermined duration in response to an enabling input applied thereto by way of conductor 65. When the range gate pulse is present at the gate 62, the gate is enabled such that the regularly occurring pulses from the pulse generator 58 are permitted to pass through the gate and conductor 68 to the input of the counter 50. Since both the sweep period and the number of pulses passing through the gate 62 are controlled by the output from the range gate 64, the counter 50 is advanced by a predetermined count during each radial sweep interval. The count contained in counter 50 is therefore a function of the range information. If, for example, K pulses are allowed to pass through the AND gate 62 during each radial sweep, the range resolution will be 1/K. To summarize, the frequencies of the range gate 64 and computer sweep generator 30 are equal. As long as a range gate pulse continues, the computer sweep signal continues and the stable pulse generator 58 continues to step the counter 50 to provide a running digital indication of the instantaneous range attained by the sweep. After a sufficient time to reach a selected maximum count of K range increments, the range gate pulse terminates, thereby terminating the sweep signal and the range count. Thus, the maximum sweep range is a function of the range gate pulse duration; and the range gate pulse duration in turn must be K times the period of the stable pulse generator 58.

At the same time the counter 50 is being advanced, pulses are being applied to the counter 48 by way of the pickup device 52 and conductor 56. Because the pickup device is associated with the rotation of the high speed resolver 26, the instantaneous count in the counter 48 is a function of the angular position which the trace would occupy on the face of the display tube if the sweep switch 63 was set to connect the lines 38 and 40 to the deflection circuits. If there are N pulses produced during each revolution of the shaft of the high speed resolver, the azimuth resolution obtainable will be 1/N. As the counters 48 and 50 are advanced a point will be reached in which the information or count contained in these counters, is identical in value to the binary data to be displayed which is contained in the computer output register. This identity is detected by means of the coincidence gate 72, and an output pulse to indicate this condition is developed on the conductor 78. Since the computer is, at this time, "ready" to display its information, the AND gate 80 will be in an enabled condition so that the output from the coincidence gate will appear on conductor 82 and be applied to the input line 84 of the sweep switch 36. As already mentioned, this pulse is effective to connect the output lines from the high speed resolver to the horizontal and vertical deflection circuits of the display tube to establish a field which rotates at a speed determined by the rotational velocity of the shaft of the high speed resolver. This pulse on line 82 also passes through the video switch 86 to the grid of the cathode-ray tube to permit intensification of the trace on the face of this display tube at a point determined by the abovementioned field which exists at this time. The rate at which the sweep traverses the face of the display tube being determined by the speed of rotation of the shaft of the resolvers, the changeover from a radar display to a display computer generated information will not cause a lengthy interruption of the radar display since the high speed resolver shaft rotates at a considerably higher rate than does the shaft of the low speed resolver. The display of the computer information will appear to the operator to be merely an intensified spot in the midst of the radar display at a definite coordinate location. A typical PPI display is shown in FIGURE 3 with numerals 106 indicating radar observed information and numeral 108 indicating computer generated information.

The output signal from the coincidence gate 72 when passing through the AND gate 80 also appears on line 88 leading back to the computer. The signal on this line is utilized by the computer to indicate that the information previously contained in the output register 74 has been displayed and that new information can be loaded into the output register for subsequent presentation on the display tube. In order to prevent this change in information from occurring prematurely, i.e., before the desired information has been displayed, a delay line 90 may be required such that all the signals have been applied to the display system before the computer receives the resume signal.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In combination with digital computer apparatus, means for producing a visual display of both radar information and computer generated information comprising: cathode-ray tube display means; a radar receiver normally connected to said cathode-ray tube display means; means for generating sweep signals; means for resolving said sweep signals into two sinusoidal components which are functions respectively of the sine and cosine of an angle which is related to the orientation angle of a rotating antenna; switch means adapted to connect said components produced by said resolving means to the deflection circuit of said display means to establish a rotating trace on the face of said display means; register means for holding digital information to be displayed; counting means; means for advancing said counting means by an amount which is a function of said orientation angle and of the period of said sweep signals; means connected to the output of said register means and said counting means for producing an output pulse when the digital information in said register is equal to that in said counting means; and means responsive to said pulse for operating said switch means and for intensifying said trace to present a visual spot at the location defined by the information contained in said register whereby said radar receiver is temporarily disconnected from said cathode-ray tube display means for a period sufficient to display said information contained in said register.

2. In combination with digital computer apparatus, mean for producing a visual display of both radar information and computer generated information comprising: cathode-ray tube display means; a radar receiver normally connected to said cathode-ray tube display means; a first source of sweep signals; a second source of sweep signals of higher frequency than said first source; first and second means controlling said first and second sources for resolving each of said sweep signals into two sinusoidal components which are functions respectively of the sine and cosine of an angle which is related to the orientation angle of a rotating antenna; switch means operable between first and second conditions to alternately connect said components produced by said first and second means respectively to the deflection circuit of said display means to establish a rotating trace on the face of said display means; register means for holding digital information to be displayed; counting means; means for advancing said counting means by an amount which is a function of said orientation angle and of the period of one of said sweep signals; means connected to the output of said register means and said counting means for producing an output pulse when the digital information in said register is equal to that in said counting means; and means responsive to said pulse for operating said switch means from said first to said second condition and for intensifying said trace whereby said radar receiver is disconnected from said cathode-ray tube display means while said switch means is in said second condition.

3. In combination with digital computer apparatus, means for producing a visual display of both radar information and computer generated information comprising: cathode-ray tube display means; a radar receiver normally connected to said cathode ray tube display means; a first source of sweep signals; a second source of sweep signals of higher frequency than said first source; first and second means excited respectively by said first and second sources for resolving each of said sweep signals into two sinusoidal components the respective magnitudes of which are functions of the sine and cosine of an angle which is related to the orientation angle of a rotating antenna; switch means operable between a first and second condition to alternately connect said components produced by said first and second means to the deflection circuit of said display means to establish a rotating trace on the face of said display means; a computer output register for temporarily holding digital information to be displayed; first and second counting means; means for advancing said first counting means as a function of said orientation angle; means for advancing said second counting means by an amount which is a function of the period of the sweep signals from said second source; means connected to the output of said register means and said first and second counting means for producing an output pulse when the digital information contained in said register is equal to that contained in said first and second counting means; and means responsive to said pulse for operating said switch means from said first to said second condition and for intensifying said trace whereby said radar receiver is disconnected from said cathode-ray tube display means while said switch means is in said second condition.

4. In combination with digital computer apparatus, means for producing a visual display of both radar information and computer generated information comprising: cathode-ray tube display means; a radar receiver normally connected to said cathode-ray tube display means; a first source of sweep signals; a second source of sweep signals of higher frequency than said first source; first and second means excited respectively by said first and second sources for resolving each of said sweep signals into two sinusoidal components the respective magnitudes of which are functions of the sine and cosine of an angle related to the orientation angle of a rotating antenna; pulse responsive switch means operable between a normal first and second condition to alternately connect said components produced by said first and second means to the deflection circuit of said display means to establish a rotating trace on the face of said display means; a computer output register for holding digital information to be displayed; first and second counting means; means for advancing said first counting means in relation to the orientation angle of the antenna; means for advancing said second counting means in relation to the sweep frequency of said second source; means connected to the output of said register means and said first and second counting means for producing an output pulse when the digital information in said register is equal to that in said first and second counting means; and means for applying said pulse to said pulse responsive switch means for operating said switch means from said normal first to said second condition and for intensifying said trace whereby said radar receiver is disconnected from said cathode-ray tube display means while said switch means is in said second condition.

5. In combination with digital computer apparatus means for producing a visual display of both radar information and computer generated information comprising: cathode-ray tube display means; a radar receiver normally connected to said cathode-ray tube display means; a first source of sweep signals; a second source of sweep signals of higher frequency than said first source; first and second means excited respectively by said first and second sources for resolving each of said sweep signals into two sinusoidally varying components the respective magnitudes of which are functions of the sine and cosine of an angle related to the orientation angle of a rotating antenna, said second means producing components of a higher angular frequency than said first means; pulse responsive switch means operable between a normal first and a second condition to alternately connect said components produced by said first means and second means to the deflection circuit of said display means to establish a rotating trace on the face of said display means; register means for holding digital information to be displayed; first and second counting means; means for advancing said first counting means at a rate proportional to the rate of rotation of said antenna; means for advancing said second counting means at a rate proportional to the period of the sweep signal from said second source; means connected to the output of said register means and said first and second counting means for producing an output pulse when the digital information contained in said register is equal to that contained in said first and second counting means; and means for applying said pulse to said pulse responsive switch means for operating said switch means from said first to said second condition and for simultaneously intensifying said trace whereby said radar receiver is disconnected from said cathode-ray tube display means while said switch means is in said second condition.

6. In combination with digital computer apparatus, means for producing a visual display of both radar information and computer generated information in polar coordinates on a cathode-ray tube comprising: cathode-ray tube display means; a radar receiver normally connected to said cathode-ray tube display means; a first source of sweep signals; a second source of sweep signals of higher frequency than said first source; first and second rotary transformers coupled to the radar receiving antenna and excited respectively by said first and second sources for resolving each of said sweep signals into two sinusoidally varying components the respective magnitudes of which are functions of the sine and cosine of an angle related to the azimuth angle of a rotating antenna, said second transformer producing components of a higher angle frequency than said first transformer; pulse responsive switch means operable between a normal first and a second condition to alternately connect said components produced by said first transformer and said second transformer to the deflection circuit of said display means to establish a rotating trace on the face of said display means; computing means having output register means for holding digital information to be displayed; first and second pulse counting means; means for advancing said first counting means such that the instantaneous pulse count is proportional to the angular displacement of the rotor of said second transformer means; means for advancing said second pulse counting means at a fixed rate during the period of the sweep signals from said second source; signal comparing means connected to the output of said register means and said first and second counting means for producing an output pulse when the digital information in said register is equal to that in said first and second counting means; and means for applying said pulse to said pulse responsive switch means for operating said switch means from said first to said second condition and for intensifying said trace whereby said radar receiver is disconnected from said cathode-ray tube display means while said switch means is in said second condition.

7. In a combination with digital computer apparatus, means for producing a visual display of both radar information and computer generated information comprising: cathode-ray tube display means adapted to receive radar information from a radar receiver; means for generating sweep signals; means for resolving said sweep signals into two sinusoidal components which are functions respectively of the sine and cosine of an angle which is related to the orientation angle of a rotating antenna; switch means adapted to connect said components produced by said resolving means to the deflection circuit of said display means to establish a rotating trace on the face of said display means; register means for holding digital information to be displayed; counting means; means for advancing said counting means by an amount which is a function of said orientation angle and of the period of said sweep signals; means connected to the output of said register means and said counting means for producing an output pulse when the digital information in said register is equal to that in said counting means; and means responsive to said pulse for operating said switch means and for intensifying said trace to present a visual spot at the location defined by the information contained in said register whereby said cathode-ray tube display means is prevented from receiving radar information for a period sufficient for said cathode-ray tube means to display said information contained in said register.

8. In combination with digital computer apparatus, means for producing a visual display of both radar information and computer generated information comprising: cathode-ray tube display means adapted to receive radar information from a radar receiver; a first source of sweep signals; a second source of sweep signals of higher frequency than said first source; first and second means excited respectively by said first and second sources for resolving each of said sweep signals into two sinusoidal components the respective magnitudes of which are functions of the sine and cosine of an angle which is related to the orientation angle of a rotating antenna; switch means operable between a first and second condition to alternately connect said components produced by said first and second means to the deflection circuit of said display means to establish a rotating trace on the face of said display means; a computer output register for temporarily holding digital information to be displayed; first and second counting means; means for advancing said first counting means as a function of said orientation angle; means for advancing said second counting means by an amount which is a function of the period of the sweep signals from said second source; means connected to the output of said register means and said first and second counting means for producing an output pulse when the digital information contained in said register is equal to that contained in said register is equal to that contained in said first and second counting means; and means responsive to said pulse for operating said switch means from said first to said second condition and for intensifying said trace whereby said cathode-ray tube display means is prevented from receiving radar information while said switch means is in said second condition.

9. In combination with digital computer apparatus, means for producing a visual display of both radar information and computer generated information comprising: cathode-ray tube display means adapted to receive radar information from a radar receiver; a first source of sweep signals; a second source of sweep signals of higher frequency than said first source; first and second means excited respectively by said first and second sources for resolving each of said sweep signals into two sinusoidal components the respective magnitudes of which are functions of the sine and cosine of an angle related to the orientation angle of a rotating antenna; pulse responsive switch means operable between a normal first and second condition to alternately connect said components produced by said first and second means to the deflection circuit of said display means to establish a rotating trace on the face of said display means; a computer output register for holding digital information to be displayed; first and second counting means; means for advancing said first counting means in relation to the orientation angle of the antenna; means for advancing said second counting means in relation to the sweep frequency of said second source; means connected to the output of said register means and said first and second counting means for producing an output pulse when the digital information in said register is equal to that in said first and second counting means; and means for applying said pulse to said pulse responsive switch means for operating said switch means from said normal first to said second condition and for intensifying said trace whereby said cathode-ray tube display means is prevented from receiving radar information while said pulse responsive switch means is in said second condition.

No references cited.